W. E. WOODWARD.

LEGGING.

APPLICATION FILED MAR. 31, 1914.

Reissued June 9, 1914.

13,747.

Witnesses;

E. H. Waite

Edwin Shivell

Inventor,

Walter E. Woodward;

By A. B. Higham

Attorney.

UNITED STATES PATENT OFFICE.

WALTER E. WOODWARD, OF MALDEN, MASSACHUSETTS.

LEGGING.

13,747. Specification of Reissued Letters Patent. Reissued June 9, 1914.

Original No. 1,070,652, dated August 19, 1913, Serial No. 662,025. Application for reissue March 31, 1914. Serial No. 828,644.

*To all whom it may concern:*

Be it known that I, WALTER E. WOODWARD, a citizen of the United States, and a resident of Malden, in the county of Middlesex and Commonwealth of Massachusetts, have invented certain new and useful Improvements in Leggings, of which the following is a full, clear, and exact description.

The object of this invention is the construction of improved means for protecting the lower part of the legs and ankles of the wearer against snow, rain and mud, and, in addition, for shielding the upper portion of the foot against the access of rain through the laced or buttoned opening of the shoe.

In carrying out my invention, I have sought to make the leggings easy to apply and fasten, neat and attractive in appearance, and capable of being folded into a small compass for convenience in carrying and storing away when not in use.

Figure 1:
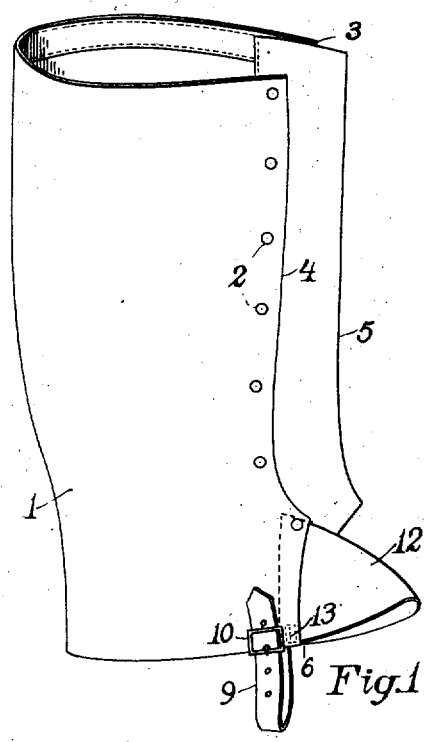
Figure 2:
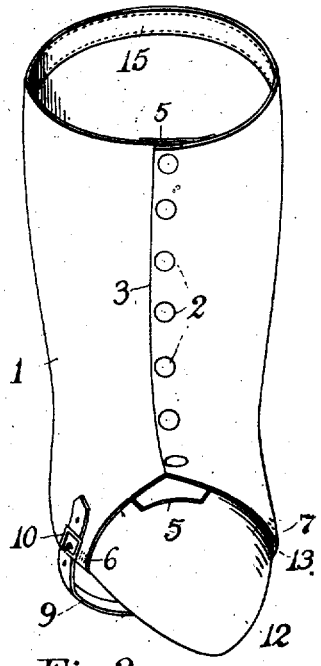
Figure 3:
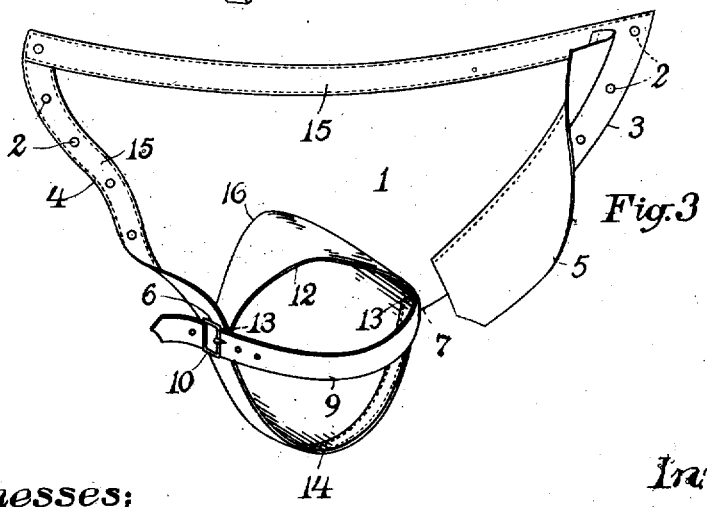

In the drawings forming part of this specification, Figure 1 is a side elevation of a legging embodying my invention, showing the same unfastened. Fig. 2 is a perspective view of the same from in front and fastened together in the manner of its use. Fig. 3 is a perspective view of the legging thrown wide open and ready to be drawn over the boot.

The material of which the legging is made is not essential, so long as it is flexible and more or less waterproof, as it may be of rubber-coated fabric, or any of the usual kinds of cloth treated to render them resistant to moisture.

The body 1 of the legging is shaped to approximately fit the calf and ankle of its wearer, and is adapted to come together at or near the front of the leg, and to be fastened together thereat in any suitable way. The fastening means illustrated are the well known ball-and-socket type, as indicated by the numeral 2. I prefer this fastening for many reasons, both for its superior neatness and convenience, and because it requires the edges of the legging to overlap each other and so to more thoroughly protect the front of the leg. I do not, however, restrict myself thereto, since buckles and other well known devices are equally applicable.

To the edge 3 which is adapted to overlap the edge 4 is attached a flap 5, the line of attachment being far enough back from the edge 3 to make room for the edge 4, and the flap being wide enough to reach an inch or two past the latter edge and so to insure against the admission of moisture through the line of closure.

As shown in Fig. 1, the lower corners of the legging are cut away to make room for the foot, and to the extremities 6 and 7 of the lower edge of the legging is fastened a strap 9, the strap itself being usually fastened to the point 7, and a buckle 10 therefor being secured to the point 6. The only object of the buckle being for adjusting the length of the strap, the same is not very essential and the strap may be permanently attached at its ends to said points.

The legging as thus far described leaves the upper part of the wearer's foot entirely unprotected. I therefore provide the shield 12, shaped to fit over the instep and as far toward the toe as the lacings or buttons extend. This is fastened at its corners 13 to the points or corners 6 and 7 of the legging, so that the latter can be opened wide, as shown in Fig. 3, for its application to the leg of the wearer.

In putting this legging on, it is opened, as shown in Fig. 3, and drawn onto the foot, the toe of the boot being introduced through the space between the strap 9 and the shield 12, until the heel reaches and settles down into the space between said strap and the edge 14. The edges 3 and 4 are then brought together and fastened, the flap 5 being smoothed out back of the underlying edge 4, with its lower end exterior to the upper edge of the shield 12. Consequently, whatever water may work in between said edges 3 and 4 will run down upon the outside of said flap and from its lower end will pass to the outside of said shield and from thence to the ground. Thus the ankles and shoe tops of the wearer will be kept entirely clean and dry.

There are several advantages secured in my construction of legging: In the first place, by having it open down the front, it is made much easier and more convenient to manipulate the fastening devices. But to have the legging thus open at or near the front renders it almost impossible to provide a shield 12 which will allow free ankle-motion, and it was not until I discovered or conceived the idea of attaching only its lower rear corners to the front lower corners of the legging-body, that it was rendered practicable. Such arrangement of the same permits both the free ankle motion and in addition enables the legging-body to be widely opened for its easy application to the wearer's leg.

It should be noted that the edges of the legging immediately above the corner 6 and which are adjacent to the surface of the shield or toe-piece 12, are nearly vertical so that the surface of the toe-piece for a considerable distance toward its extremity from said edges is nearly concentric with the points of attachment 13. Consequently, as the foot of the wearer is flexed upward, there is no variation or relative displacement between the surface of the toe-piece and said edges. This enables such space between said parts to be so restricted as to insure against the admission of snow and rain.

The parts 15 are strengthening or stiffening lengths of braid or tape represented as stitched to the edges of the legging-body. If desired, the vertical lengths of the parts 14 may be featherbone or other means for so stiffening the legging body against working down toward the feet, that very thin and pliable material may be employed for said body.

In putting this legging on, I prefer to take hold of the strap with one hand, and of the part 16 of the shield 12 with the other hand, and then, having inserted the toe of the foot in between said parts, to draw the same on over the foot. This insures that said part 16 shall not double over in the application of the legging to the boot or shoe.

What I claim as my invention and for which I desire Letters Patent is as follows, to wit:—

1. A legging comprising a fabric loosely fitted to the wearer's ankle and lower limb and adapted to be fastened together at the front of the limb, a toe-piece fitting over the upper part of the wearer's shoe and attached at its two rear corners to the lower side edges of the legging, and a strap terminally attached to said edges near said corners, the front edges of the lower part of the legging being nearly vertical, whereby the displacement between the surface of the toe-piece and the edges of the legging adjacent thereto is reduced to a minimum during the action of walking, and free ankle-motion is permitted.

2. A legging adapted to be loosely fitted about the sides and rear of the wearer's lower limb, the edges thereof meeting along the front-central part of said limb, one of said edges passing a slight distance in front of the other edge and having a flap located behind said other edge, detachable means for fastening said edges together, a toe-piece fitting over the upper surface of the wearer's shoe and attached at its two rear corners to the lower side edges of said legging, and a strap attached to said edges.

In testimony that I claim the foregoing invention, I have hereunto set my hand this 19th day of March, 1914.

WALTER E. WOODWARD.

Witnesses:

J. Mason Cross,

T. Elmore Craig.